(12) United States Patent
Maqbool

(10) Patent No.: US 11,434,851 B2
(45) Date of Patent: Sep. 6, 2022

(54) SYSTEMS AND METHODS FOR AIR-BREATHING WAVE ENGINES FOR THRUST PRODUCTION

(71) Applicant: North American Wave Engine Corporation, College Park, MD (US)

(72) Inventor: Daanish Maqbool, Hyattsville, MD (US)

(73) Assignee: NORTH AMERICAN WAVE ENGINE CORPORATION, College Park, MD (US)

( * ) Notice: Subject to any disclaimer, the term of this patent is extended or adjusted under 35 U.S.C. 154(b) by 145 days.

(21) Appl. No.: 16/750,939

(22) Filed: Jan. 23, 2020

(65) Prior Publication Data

US 2020/0158048 A1    May 21, 2020

Related U.S. Application Data

(62) Division of application No. 15/382,104, filed on Dec. 16, 2016, now Pat. No. 10,557,438.

(Continued)

(51) Int. Cl.
*F02K 7/02*     (2006.01)
*F02K 7/067*    (2006.01)
(Continued)

(52) U.S. Cl.
CPC .................. *F02K 7/04* (2013.01); *F02C 5/10* (2013.01); *F02K 7/02* (2013.01); *F02K 7/067* (2013.01); *F23C 15/00* (2013.01)

(58) Field of Classification Search
CPC ... F02K 7/02; F02K 7/04; F02K 7/067; F02C 5/10; F23C 15/00; F23R 7/00
See application file for complete search history.

(56) References Cited

U.S. PATENT DOCUMENTS

| | | |
|---|---|---|
| 2,480,540 A | 8/1949 | Bodine, Jr. |
| 2,480,626 A | 8/1949 | Bodine |

(Continued)

FOREIGN PATENT DOCUMENTS

| | | |
|---|---|---|
| CN | 85101521 A | 1/1987 |
| CN | 87105408 A | 3/1988 |

(Continued)

OTHER PUBLICATIONS

Westberg "Inside the pulsejet engine" published Apr. 25, 2000. (Year: 2000).*

(Continued)

*Primary Examiner* — Ted Kim
(74) *Attorney, Agent, or Firm* — Wilmer Cutler Pickering Hale and Dorr LLP

(57) ABSTRACT

A pulse combustor system for efficiently operating a pulse combustor. The pulse combustor system includes the pulse combustor and a duct. The pulse combustor has a combustion chamber defining an internal space, a conduit having a first end in fluid communication with the internal space and a second end in fluid communication with an environment outside of the pulse combustor system, and a fuel injector configured to inject fuel into the internal space of the combustion chamber. The duct has two openings, with one opening disposed adjacent to the second end of the conduit. The pulse combustor system has an average operating frequency, and the duct has a length that is about one quarter of a wavelength corresponding to the average operating frequency. The pulse combustor and the duct each has a central longitudinal axis, and the two axes are substantially aligned.

5 Claims, 5 Drawing Sheets

Related U.S. Application Data

(60) Provisional application No. 62/269,592, filed on Dec. 18, 2015.

(51) Int. Cl.
*F02K 7/04* (2006.01)
*F02C 5/10* (2006.01)
*F23C 15/00* (2006.01)

(56) References Cited

U.S. PATENT DOCUMENTS

| | | | |
|---|---|---|---|
| 2,523,308 A | 9/1950 | Kemmer | |
| 2,543,758 A | 3/1951 | Bodine | |
| 2,557,128 A | 6/1951 | Magill | |
| 2,628,471 A | 2/1953 | Dunbar | |
| 2,632,294 A | 3/1953 | Wall | |
| 2,639,580 A * | 5/1953 | Stuart | F02K 7/04 60/249 |
| 2,698,510 A | 1/1955 | Britton | |
| 2,731,795 A | 1/1956 | Bodine | |
| 2,750,733 A | 6/1956 | Paris | |
| 2,796,734 A | 6/1957 | Bodine | |
| 2,812,635 A | 11/1957 | Foll et al. | |
| 2,834,181 A | 5/1958 | Paris | |
| 2,834,183 A | 5/1958 | Bertin et al. | |
| 2,838,102 A | 6/1958 | Reimers | |
| 2,860,484 A * | 11/1958 | Schmidt | F23C 15/00 60/39.77 |
| 2,872,780 A | 2/1959 | Schmidt | |
| 2,919,542 A | 1/1960 | Servanty et al. | |
| 2,937,500 A | 5/1960 | Bodine, Jr. | |
| 2,948,113 A | 8/1960 | Lettice | |
| 3,005,310 A | 10/1961 | Reder | |
| 3,035,413 A | 5/1962 | Linderoth | |
| 3,044,252 A * | 7/1962 | Zwicky | F02K 7/02 60/221 |
| 3,185,871 A | 5/1965 | Bodine, Jr. | |
| 3,303,643 A * | 2/1967 | Beardsley | F02C 5/00 60/772 |
| 3,462,955 A | 8/1969 | Lockwood | |
| 3,606,867 A | 9/1971 | Weissinger | |
| 3,768,926 A | 10/1973 | Pegg et al. | |
| 4,033,120 A | 7/1977 | Kentfield | |
| 4,314,444 A | 2/1982 | Putnam et al. | |
| 4,840,558 A | 6/1989 | Saito et al. | |
| 5,353,721 A | 10/1994 | Mansour et al. | |
| 5,428,951 A | 7/1995 | Wilson et al. | |
| 5,638,609 A * | 6/1997 | Chandran | F23C 15/00 34/365 |
| 5,665,272 A | 9/1997 | Adams et al. | |
| 6,477,829 B1 | 11/2002 | Hunter et al. | |
| 6,640,549 B1 | 11/2003 | Wilson et al. | |
| 6,793,174 B2 | 9/2004 | Ouellette et al. | |
| 7,637,096 B2 | 12/2009 | Razzell et al. | |
| 8,408,004 B2 | 4/2013 | Davis, Jr. et al. | |
| 8,607,542 B2 | 12/2013 | Mason | |
| D757,859 S | 5/2016 | Goitein | |
| D759,764 S | 6/2016 | Lai | |
| 9,527,588 B1 | 12/2016 | Rollefstad | |
| D784,854 S | 4/2017 | Huang et al. | |
| D795,785 S | 8/2017 | Morrison et al. | |
| D800,602 S | 10/2017 | Hsiao et al. | |
| D801,223 S | 10/2017 | Hsiao et al. | |
| D808,860 S | 1/2018 | Tian et al. | |
| D809,992 S | 2/2018 | Hu et al. | |
| D816,582 S | 5/2018 | Liang et al. | |
| 10,546,070 B2 | 1/2020 | Hellat et al. | |
| 10,995,703 B2 | 5/2021 | Maqbool | |
| 2005/0138933 A1 | 6/2005 | Tegner | |
| 2006/0260291 A1 | 11/2006 | Vandervort et al. | |
| 2007/0245712 A1 | 10/2007 | Shimo et al. | |
| 2009/0139203 A1 | 6/2009 | Rasheed et al. | |
| 2009/0178415 A1 | 7/2009 | Kretschmer | |
| 2010/0139240 A1 | 6/2010 | Levasseur | |
| 2012/0083945 A1 | 4/2012 | Oakley et al. | |
| 2012/0131901 A1 | 5/2012 | Westervelt et al. | |
| 2012/0204534 A1 | 8/2012 | Kenyon et al. | |
| 2013/0019602 A1 | 1/2013 | Kim et al. | |
| 2014/0260294 A1 | 9/2014 | Farshchian | |
| 2014/0339355 A1 | 11/2014 | Olm et al. | |
| 2016/0001879 A1 | 1/2016 | Johannesson et al. | |
| 2016/0290223 A1 | 10/2016 | Mills | |
| 2016/0304196 A1 | 10/2016 | Alber | |
| 2017/0082067 A1 | 3/2017 | Maqbool | |
| 2017/0144756 A1 | 5/2017 | Rastgaar Aagaah et al. | |
| 2017/0152035 A1 | 6/2017 | Zhao et al. | |
| 2017/0210470 A1 | 7/2017 | Pardell | |
| 2017/0297707 A1 | 10/2017 | Rollefstad et al. | |
| 2018/0065735 A1 | 3/2018 | Ichihara | |
| 2020/0003158 A1 | 1/2020 | Maqbool | |
| 2020/0256260 A1 | 8/2020 | Maqbool et al. | |
| 2021/0108590 A1 | 4/2021 | Maqbool et al. | |

FOREIGN PATENT DOCUMENTS

| | | |
|---|---|---|
| CN | 2050553 U | 1/1990 |
| CN | 101907038 A | 12/2010 |
| CN | 111271735 A | 6/2020 |
| DE | 102013216398 A1 | 2/2015 |
| EP | 1348908 A2 | 10/2003 |
| EP | 2642204 A1 | 9/2013 |
| EP | 3390796 B1 | 2/2021 |
| EP | 3587925 B1 | 10/2021 |
| FR | 951942 A | 11/1949 |
| GB | 781482 A | 8/1957 |
| GB | 789701 A | 1/1958 |
| GB | 0409664 A | 6/2004 |
| GB | 2420615 A | 5/2006 |
| JP | H0249933 A | 2/1990 |
| WO | WO-2016200459 A2 | 12/2016 |
| WO | WO-2019204389 | 10/2019 |

OTHER PUBLICATIONS

International Preliminary Report on Patentability issued by the European Patent Office in International Application No. PCT/US2019/039510, dated Dec. 29, 2020 (8 pages).

International Preliminary Report on Patentability, issued by the European Patent Office as International Searching Authority, in International Application No. PCT/US2019/027801, dated Oct. 20, 2020 (10 pages).

International Search Report and Written Opinion issued by the European Patent Office as International Searching Authority, issued in International Application No. PCT/US2019/039510 dated May 26, 2020 (14 pages).

"Standing Waves Review", Khan Academy, https://www.khanacademy.org/science/ap-physics-1/ap-mechanical-waves-and-sound/standing-waves-ap/a/standing-waves-review-ap, accessed Jul. 16. 2020 (3 pages).

Ipakchi, H., "Development and performance characteristics of a family of gas-fired pulsed combustors.", Thesis for Middlesex University School of Engineering Systems, Jun. 2000 (291 pages—full document).

Poinsot, T.J. et al., "Vortex-driven acoustically coupled combustion instabilities", J. Fluid Mech, 177:265-292, 1987 (28 pages).

Reynst, Franscis H., "Pulsating Combustion," Pergamon Press, 6 pages—Cover Page, Copyright Page, Table of Contents and pp. 208-209 (1961).

Zheng, F. et al., "A New Acoustic Model for Valveless Pulsejets and Its Application to Optimization Thrust", Journal of Engineering for Gas Turbines and Power, 130:041501-1-041501-9, Jul. 2008 (9 pages).

Blomquist, C. A., "Experimental Gas-Fired Pulse-Combustion Studies", prepared for Jet Propulsion Laboratory, for U.S. Department of Energy, Argonne National Laboratory, ANL/EES-TM-214, Sep. 1982 (313 pages—full document).

European Search Report issued in EP19191692.3, dated Sep. 30, 2019 (7 pages).

(56) References Cited

OTHER PUBLICATIONS

Evans, R.G. et al., "Pulse Jet Orchard Heater System Development: Part I. Design, Construction, and Optimization", Transactions of the ASABE, 52(2):331-343, 2009 (13 pages).

Giammar, R.D. et al., "Noise Reduction Using Paired Pulse Combustors", Journal Energy, 2(5):319-320, Sep.-Oct. 1978 (2 pages).

Heutschi, "Acoustics II: Electrical-Mechanical-Acoustical Analogies", Eidgenössische Technische Hochschule Zürich, Swiss Federal Institute of Technology Zurich, Jan. 18, 2013 (91 pages).

International Search Report and Written Opinion issued by the European Patent Office as International Searching Authority for International Application No. PCT/US2016/023238 dated Dec. 5, 2016 (11 pages).

International Search Report and Written Opinion issued by the European Patent Office as International Searching Authority for International Application No. PCT/US2016/067242 dated May 18, 2017 (14 pages).

International Search Report and Written Opinion issued by the European Patent Office as International Searching Authority, issued in PCT/US19/27801, dated May 31, 2019 (16 pages).

International Search Report and Written Opinion issued by the U.S. Patent and Trademark Office as International Searching Authority for International Application No. PCT/US2016/023241 dated Nov. 29, 2016 (6 pages).

U.S. Department of Energy, "Pressure Gain Combustion", National Energy Technology Laboratory, <URL: https://netl.doe.gov/node/7553>, accessed Dec. 28, 2021 (1 page).

\* cited by examiner

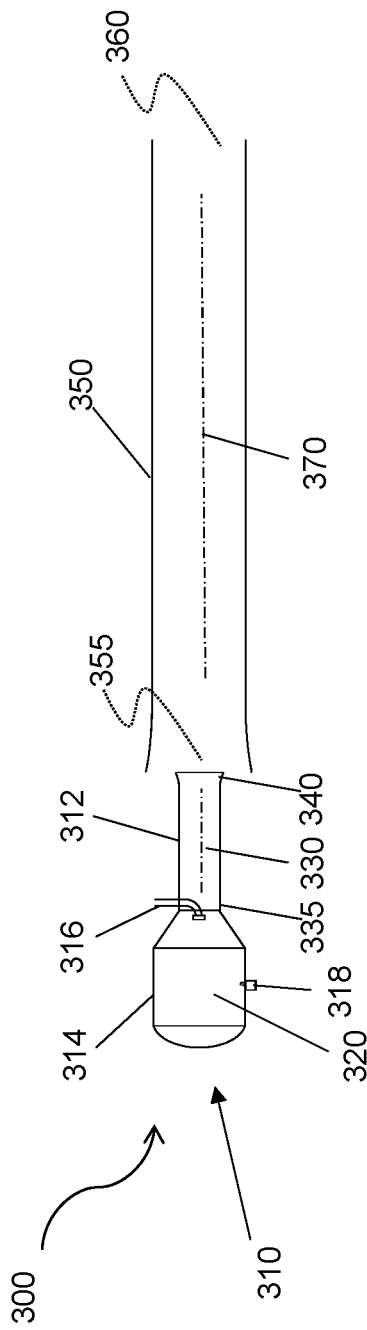
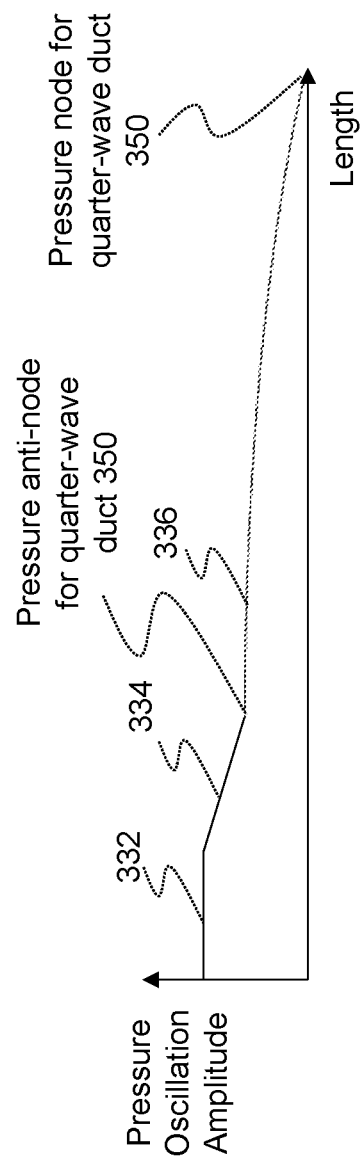
FIG. 3A
FIG. 3B

SYSTEMS AND METHODS FOR AIR-BREATHING WAVE ENGINES FOR THRUST PRODUCTION

CROSS-REFERENCE TO RELATED APPLICATIONS

This application is a division of U.S. patent application Ser. No. 15/382,104, entitled "Systems And Methods For Air-Breathing Wave Engines For Thrust Production," Filed on Dec. 16, 2016, now U.S. patent Ser. No. 10,557,438, which claims benefit under 35 U.S.C. 119(e) to U.S. Provisional Patent Application No. 62/269,592, filed on Dec. 18, 2015, each of which are explicitly incorporated by reference herein in their entirety.

All publications, patent applications, patents, and other references mentioned herein are incorporated by reference in their entirety. The patent and scientific literature referred to herein establishes knowledge that is available to those skilled in the art. The issued patents, applications, and other publications that are cited herein are hereby incorporated by reference to the same extent as if each was specifically and individually indicated to be incorporated by reference. In the case of inconsistencies, the present disclosure will prevail.

TECHNICAL FIELD

The present disclosure generally relates to combustors, and more specifically to improving thrust production of combustors.

BACKGROUND

A typical pulse combustor (or pulsejet engine of the valveless type) consists of a combustion chamber, an inlet pipe, fuel injector(s), spark plug (or other ignition means), and an exhaust pipe (sometimes referred to as 'tailpipe'). The combustion chamber, inlet pipe and exhaust are often cylindrical. The diameter of the inlet and exhaust pipes is typically less than the diameter of the combustion chamber, and the length of the inlet pipe is typically smaller than the length of the exhaust pipe.

When fuel and air are introduced into the combustion chamber, a spark produced by the spark plug or other ignition means ignites the fuel-air mixture. The ensuing combustion process causes a rise in the temperature and pressure of the gases inside the combustion chamber. These gases then expand and escape through the inlet and exhaust pipes. The high velocity of the escaping gases causes an overexpansion and negative pressure inside the combustion chamber. This negative pressure then reverses the direction of the flow in the inlet and exhaust pipes. Fresh air sucked in from the atmosphere via the inlet pipe mixes with the fuel (which is injected either in the inlet pipe or directly into the combustion chamber) and enters the combustion chamber where it encounters high-temperature combustion products from the previous combustion event. These combustion products ignite the fresh fuel-air mixture to produce another combustion event and the process repeats indefinitely. It should be noted that there is also flow reversal in the exhaust pipe due to the negative pressure in the combustion chamber, but due to the longer length of the exhaust pipe, the fresh air drawn in from the atmosphere does not typically reach the combustion chamber before the process restarts. It should also be noted that the spark plug is only needed to start operation of the engine, and is not necessary to sustain the operation of the engine. Therefore, the spark plug can be turned off once the engine has started.

The net result of the working cycle of a pulse combustor is that the inlet and exhaust ends produce oscillating flows, i.e. intermittent jets, of gas which are responsible for thrust generation. The exhaust pipe usually generates the highest amount of thrust, but the inlet pipe can also generate a significant amount of thrust. Therefore, in order to make the thrust from the inlet pipe point in the same direction as the thrust from the exhaust pipe, the inlet pipe is often turned to point in the same direction as the exhaust pipe (or vice versa), giving the engines a "U-shape." Pulse combustors can be made in a variety of forms. Some have multiple inlets, while others have inlets that are perpendicular to the exhaust pipe. Nevertheless, all these embodiments have similar working principle and are essentially the same device.

This apparatus can be used as a combustor. The advantages of pulse combustors include the ability draw in fresh air and sustain operation without any external machinery or moving parts. Pulse combustors can also be used as thrust-producing devices, in which case they are commonly referred to as "pulsejet" or "pulse jet" engines. Pulsejet engines have a long history and have been used to propel several aircraft over the last century. They are often characterized by a diverging exhaust pipe to aid in thrust production.

Pulsejet engines are characterized by their simplicity because of the lack of moving parts. However, the oscillating nature of the exhaust flows tends to produce very high noise and vibration levels that have often been cited as the most serious hurdle in their widespread implementation. The U-shape of many pulsejet engines can also pose a challenge for airframe integration. This U-shape configuration also entails that the inlet and exhaust pipes are both facing (opening) away (opposite) from the incoming airstream in flight, which disables the engine from using the potentially-advantageous ram air pressure of the incoming airstream, thereby limiting its high-speed performance.

The invention described below is intended to address the above issues and to provide related advantages.

SUMMARY

One aspect discussed herein related to a pulse combustor system including a pulse combustor and a duct. The pulse combustor includes a combustion chamber, a conduit, and a fuel injector. The combustion chamber defines an internal space. The conduit has a first central longitudinal axis, a first end in fluid communication with the internal space, and a second end in fluid communication with an environment outside of the pulse combustor. The fuel injector is configured to inject fuel into the internal space of the combustion chamber. The duct has a second central longitudinal axis and defines a first opening disposed at a first end of the second central longitudinal axis and a second opening disposed at a second end of the second central longitudinal axis opposite the first end. The pulse combustor system has an average operating frequency, indicating an average number of combustion events per second during operation of the pulse combustor system. The second central axis of the duct is substantially aligned with the first central axis of the conduit, and the first opening of the duct is disposed adjacent to the second end of the conduit. The duct has a length that is about one quarter of a wavelength in length along the second central longitudinal axis, and the wavelength corresponds to the average operating frequency.

In some embodiments, the pulse combustor also includes a spark plug providing an ignition source for starting the pulse combustor.

In some embodiments, the duct has a uniform diameter.

In some embodiments, the conduit has a first diameter, the duct has a second diameter, and the second diameter is different from the first diameter.

In some embodiments, the conduit has a first diameter, the duct has a second diameter, and the second diameter is larger than the first diameter.

In some embodiments, the first opening of the duct and the second end of the conduit are disposed to define an air gap between the first opening of the duct and the second end of the conduit.

Another aspect discussed herein related to a pulse combustor system including a pulse combustor and a duct. The pulse combustor includes a combustion chamber, a conduit, and a fuel injector. The combustion chamber defines an internal space. The conduit has a first central longitudinal axis, a first end in fluid communication with the internal space, and a second end in fluid communication with an environment outside of the pulse combustor. The fuel injector is configured to inject fuel into the internal space of the combustion chamber. The duct has a second central longitudinal axis and defines a first opening disposed at a first end of the second central longitudinal axis and a second opening disposed at a second end of the second central longitudinal axis opposite the first end. The pulse combustor system has an average operating frequency, indicating an average number of combustion events per second during operation of the pulse combustor system. The second central axis of the duct is substantially aligned with the first central axis of the conduit, and the pulse combustor is disposed inside the duct. The length of the duct is about one half of a wavelength along the second central longitudinal axis, and the wavelength corresponds to the average operating frequency.

In some embodiments, the pulse combustor also includes a spark plug providing an ignition source for starting the pulse combustor.

In some embodiments, the conduit opens at or near a pressure anti-node of the duct during operation of the pulse combustor system at the average operating frequency.

Yet another aspect discussed herein related to a method of producing thrust in a pulse combustor system. The method includes providing a pulse combustor and a duct. The pulse combustor includes a combustion chamber, a conduit, and a fuel injector. The combustion chamber defines an internal space. The conduit has a first central longitudinal axis, a first end in fluid communication with the internal space, and a second end in fluid communication with an environment outside of the pulse combustor. The fuel injector is configured to inject fuel into the internal space of the combustion chamber. The duct has a second central longitudinal axis and a length. The duct defines a first opening disposed at a first end of the second central longitudinal axis and a second opening disposed at a second end of the second central longitudinal axis opposite the first end. The method includes disposing the duct adjacent to the conduit such that the first opening of the duct is adjacent to the second end of conduit and the second central axis of the duct is substantially aligned with the first central axis of the conduit. The pulse combustor and duct arrangement have an average operating frequency, indicating an average number of combustion events per second during operation of the pulse combustor and duct arrangement. The length of the duct is about one quarter of a wavelength along the second central longitudinal axis, and the wavelength corresponds to the average operating frequency. The method includes operating the pulse combustor and duct arrangement at the average operating frequency.

In some embodiments, the disposing the duct adjacent to the conduit further includes defining an air gap between the first opening of the duct and the second end of the conduit.

Yet another aspect discussed herein related to a method of producing thrust in a pulse combustor system. The method includes providing a pulse combustor and a duct. The pulse combustor includes a combustion chamber, a conduit, and a fuel injector. The combustion chamber defines an internal space. The conduit has a first central longitudinal axis, a first end in fluid communication with the internal space, and a second end in fluid communication with an environment outside of the pulse combustor. The fuel injector is configured to inject fuel into the internal space of the combustion chamber. The duct has a second central longitudinal axis and a length. The method includes disposing the pulse combustor inside the duct such that the second central axis of the duct substantially aligns with the first central axis of the conduit. The pulse combustor and duct arrangement have an average operating frequency, indicating an average number of combustion events per second during operation of the pulse combustor and duct arrangement. The length of the duct is about one half of a wavelength along the second central longitudinal axis, and the wavelength corresponds to the average operating frequency. The method includes operating the pulse combustor and duct arrangement at the average operating frequency.

In some embodiments, the disposing the pulse combustor inside the duct further includes disposing the second end of the conduit adjacent to a pressure anti-node formed in the duct during operation of the pulse combustor system at the average operating frequency.

Elements of embodiments described with respect to a given aspect of the invention may be used in various embodiments of another aspect of the invention. For example, it is contemplated that features of dependent claims depending from one independent claim can be used in apparatus and/or methods of any of the other independent claims.

BRIEF DESCRIPTION OF FIGURES

The foregoing and other objects, aspects, features, and advantages of the present disclosure will become more apparent and better understood by referring to the following description taken in conjunction with the accompanying drawings, in which:

FIG. 3A illustrates a pulse combustor system according to certain embodiments of the present disclosure.

FIG. 3B illustrates associated pressure oscillation amplitudes along the length of the pulse combustor system depicted in FIG. 3A.

Figure 1A:
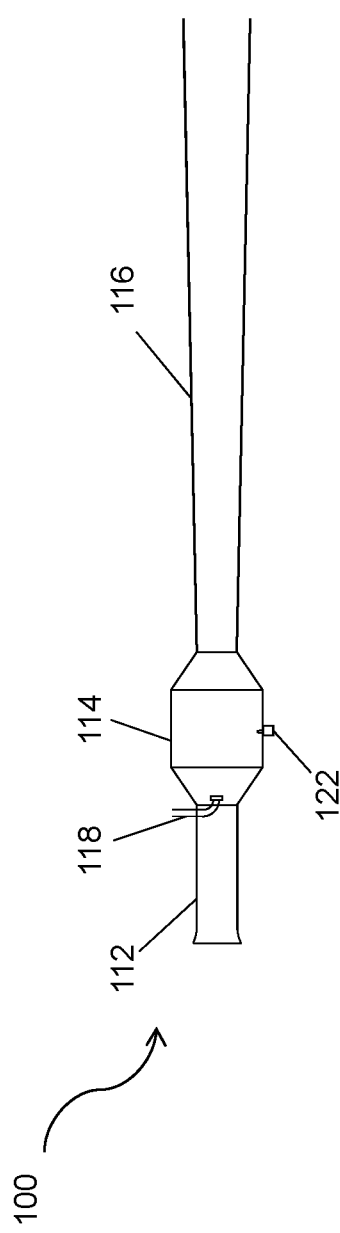
FIG. 1A illustrates a pulse combustor of the valveless type.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

In this document, "pulse combustor", "pulse jet engine", "pulse jet", "pulsejet engine" or "pulsejet" refer to the same device. It is understood that a pulsejet or pulsejet engine is a pulse combustor that is used for thrust production.

In some embodiments, the present invention includes a Reynst combustor, which is a Helmholtz resonator that hosts successive combustion events in the chamber to excite and sustain a thermo-acoustic instability. The common inlet and exhaust pipe of the Reynst combustor opens near a larger-diameter duct that is substantially one-quarter wavelength (as per the frequency of combustion events) long. This allows the Reynst combustor to energize the quarter-wave mode of the larger-diameter duct to produce an oscillating flow for thrust and/or mechanical energy production.

In some embodiments, a Reynst combustor is placed inside a duct of length one-half wavelength (as per the frequency of combustion events), in which the Reynst combustor exhaust outlet is located at the pressure anti-node of the duct half-wave mode. This allows the Reynst combustor to energize the half-wave mode of the larger-diameter duct to produce an oscillating flow for thrust and/or mechanical energy production.

In some embodiments, the present invention has a linear geometry that is suitable for aircraft integration, and can make use of ram air speed/pressure for improved high-speed performance.

Some embodiments of the invention can be used with the techniques and systems disclosed in International Patent Application No. PCT/US16/23,241, filed on Mar. 18, 2016, which is incorporated by reference herein in its entirety. For example, the improvements discussed herein can be applied to the pulse combustors disclosed in the incorporated application. However, those combustors are merely examples of the implementations that can benefit from the present disclosure and other uses are within the scope of the invention.

FIG. 1A is a pulse combustor 100 of the valveless type. In FIG. 1A, the pulse combustor 100 is comprised of the following: an inlet pipe 112 connected to a combustion chamber 114. The combustion chamber 114 is also connected to an exhaust pipe 116. There is also a fuel injector 118 located in the inlet pipe 112 and combustion chamber 114, but other locations and geometries for the fuel injector 118 are also possible. A spark plug 122 is located in the combustion chamber 114 for starting the engine. Any other ignition means (such as a glow plug) can also be used instead of a spark plug 122.

Figure 1B:
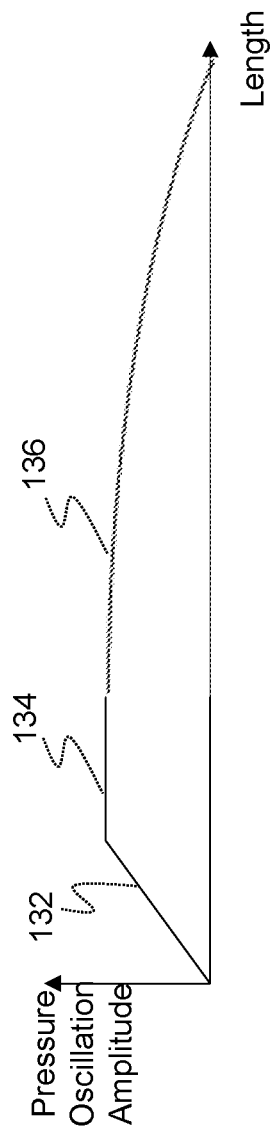
FIG. 1B illustrates associated pressure oscillation amplitudes along the length of the pulse combustor depicted in FIG. 1A.

FIG. 1B illustrates associated pressure oscillation amplitudes along the length of the pulse combustor depicted in FIG. 1A. The x-axis of FIG. 1B corresponds to the length of the pulse combustor 100, and the y-axis of FIG. 1B is the pressure oscillation amplitude. FIG. 1B has three segments: 132, 134, and 136. Segment 132 is substantially corresponding to inlet pipe 112; segment 134 is substantially corresponding to chamber 114; and segment 136 is substantially corresponding to exhaust pipe 116. FIG. 1B shows the pressure mode shape of the pulse combustor 100.

Figure 2:
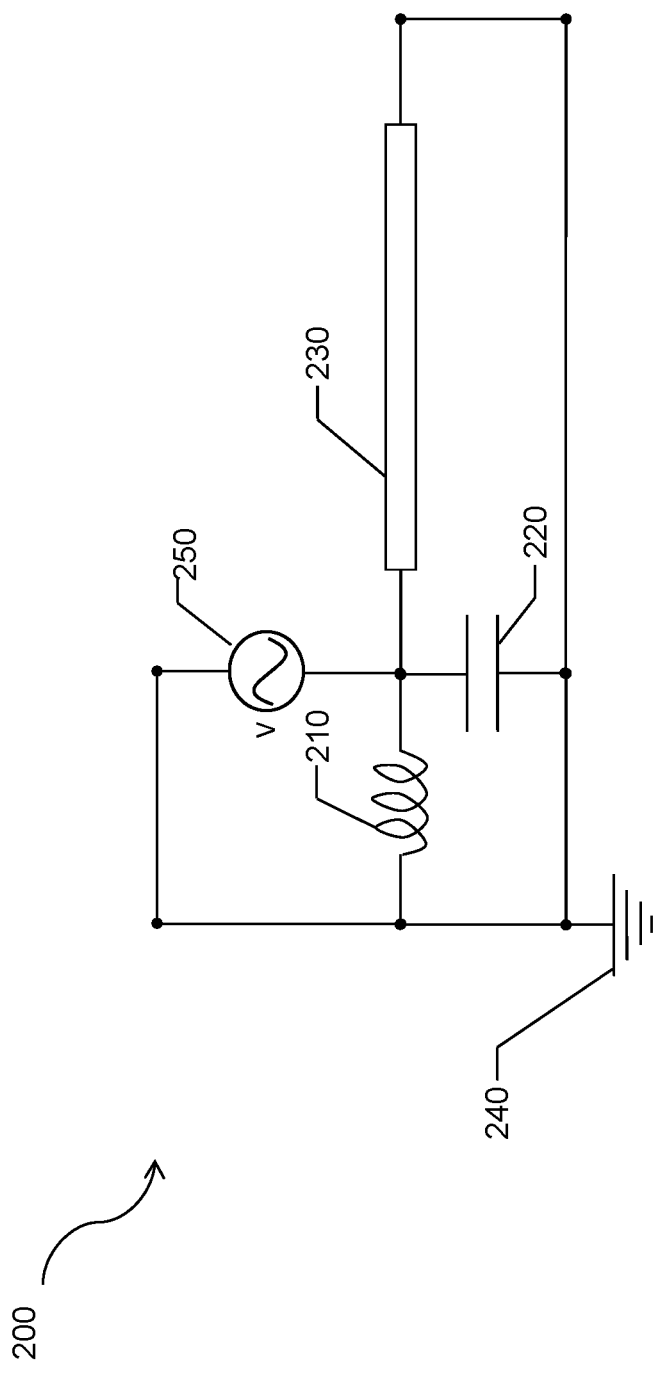
FIG. 2 illustrates an electric circuit analogy for a pulse combustor of the valveless type.

FIG. 2 is an electric circuit analogy 200 that can be used to analyze or simulate the behavior of a pulsejet of the valveless type (such as in FIG. 1). In FIG. 2, the electric circuit analogy 200 includes an inductor 210, a capacitor 220, a transmission line 230, an electrical ground 240, and a voltage source 250. One terminal of inductor 210 is connected to electrical ground 240, while the other terminal of inductor 210 is connected to capacitor 220 and transmission line 230. Capacitor 220 is connected to inductor 210 and transmission line 230 at one end, while the other end is connected to electrical ground 240. Transmission line 230 is connected to inductor 210 and capacitor 220 at one end, while the other end is connected to electrical ground 240. In FIG. 2, voltage source 250 is connected in parallel with inductor 210, but voltage source 250 can be placed at other suitable locations and/or replaced by other suitable sources such as a current source.

In FIGS. 1A and 2, combustion chamber 114 is a large volume analogous to capacitor 220. Inlet 112 is a short duct, much shorter than a wavelength as per the frequency of combustion events, and is therefore analogous to inductor 210. Exhaust/tailpipe 116 is, however, of a length comparable to the wavelength (or of the same order of magnitude), and is therefore analogous to electric transmission line 230. The combustion chamber 114 (capacitor 220) and inlet 112 (inductor 210) form a resonant circuit, similar to a Helmholtz resonator, which act as the 'core' of the pulse combustor. This core produces pressure oscillations inside the combustion chamber that are energized by combustion events, i.e., a thermo-acoustic instability (for which fresh air is sucked in via the inlet, and fuel injected via the fuel injector). In the electric circuit analogy, these pressure oscillations in the combustion chamber are voltage oscillations across the capacitor.

Therefore, the main purpose of the combustion chamber and inlet is to provide an oscillating pressure (voltage) source. As discussed below (e.g., Eqs. 3 and 4), components of the combustor system such as the chamber and inlet can be assigned an impedance value. The exhaust/tailpipe then serves as a transformer to provide a favorable impedance match between the combustion chamber (pressure/voltage source) and the atmosphere, similar to how quarter-wave transformers (transmission lines) are used in electric circuits (e.g. radio-frequency circuits) for impedance matching. This transformer (tailpipe) is needed to convert the energy in this pressure source to a high speed jet in order to produce thrust. The much shorter inlet duct is needed to induct fresh air and produce the oscillating combustion/pressure inside the combustion chamber, but this shorter duct provides a poor impedance match between the chamber and the atmosphere, and is thus an inefficient converter of the high pressure to high velocity. This would seem to explain why, in the engines developed by the Hiller Aircraft Company, the exhaust produces approximately 60% of the thrust, despite having only 40% of the area connecting to the combustion chamber (i.e. 40% of the total cross-sectional area of ducts connecting to the combustion chamber, the other 60% being the cross-sectional area of the inlet). Said another way, the combustion chamber produces high pressure gas, which is let out both the inlet and exhaust/tailpipe ends. In spite of the fact that the exhaust/tailpipe side had only 40% of the total flow area, it produced 60% of the thrust because it offered a better impedance match between the combustion chamber and atmosphere, thereby expanding the gas more efficiently.

The values of the electrical components in FIG. 2 can be calculated using well established equations known to one skilled in the art. For example, for the chamber 114, the analogous capacitance 220 is described in Eq. 1, $$C = \frac{V}{\rho c^2},\qquad\text{Eq. 1}$$

where V is the volume of the chamber, ρ is the density of the gas inside the chamber, and c is the speed of sound of the gas inside the chamber. The speed of sound is a function of the temperature and can be described in Eq. 2, $$c=\sqrt{\gamma RT}\qquad\text{Eq. 2}$$

where c is the speed of sound, γ is the ratio of specific heats, R is the gas constant, and T is the temperature.

For the inlet (or any short duct) 112, the analogous inductance 210 is described in Eq. 3:

$$L = \frac{\rho l}{A},\qquad\text{Eq. 3}$$

where ρ is the density of the gas, l is the effective length of the inlet duct 112, and A is the cross-sectional area of the inlet duct 112.

For the exhaust/tailpipe 116, the characteristics of the analogous transmission line 230 are generally calculated by breaking up the whole line into slices and assigning a capacitance and inductance to each slice using techniques known to those having ordinary skill in the art.

For the chamber 114, an analogous impedance can be expressed in Eq. 4 based on Eq. 1:

$$Z(\text{chamber}) = \frac{\rho c^2}{j\omega V},\qquad\text{Eq. 4}$$

where V is the volume of the chamber, ρ is the density of the gas inside the chamber, ω is angular frequency, and c is the speed of sound of the gas inside the chamber.

For the inlet 112, an analogous impedance can be expressed in Eq. 5 based on Eq. 3:

$$Z(\text{inlet}) = \frac{j\omega\rho l}{A},\qquad\text{Eq. 5}$$

where ρ is the density of the gas, l is the length of the duct 112, ω is angular frequency, and A is the cross-sectional area of the duct 112.

FIG. 3A illustrates a pulse combustor system 300 according to certain embodiments of the present disclosure. In FIG. 3A, the pulse combustor system 300 includes a pulse combustor 310 and a quarter-wave duct 350. The combustor 310 includes a combustion chamber 314, inlet/exhaust pipe 312, a fuel injector 316, and a spark plug 318. Combustion chamber 314 defines an internal space 320. Inlet/exhaust pipe 312 can also be referred as a conduit 312. Conduit 312 has a central longitudinal axis 330, a first end 335 in fluid communication with the internal space 320, and a second end 340 in fluid communication with an environment outside of the pulse combustor 310. Fuel injector 316, configured to inject fuel into the internal space, is located somewhere inside combustion chamber 314 and/or inlet/exhaust pipe 312, but other locations and geometries for fuel injector(s) are also possible. Spark plug 318, configured to provide an ignition source for starting the pulse combustor 310, is located in combustion chamber 314 to provide an ignition source for starting, but any other ignition means (such as a glow plug) can also be used instead of a spark plug. Quarter-wave duct 350 has a central longitudinal axis 370, a first opening 355 and a second opening 360. In some embodiments, the central axis 370 of the duct 350 is substantially aligned with the central axis 330 of the conduit 312, and the first opening 355 of the duct 350 is disposed adjacent to the second end 340 of the conduit 312. In some embodiments, there is an air gap between the first opening 355 of the duct 350 and the second end 340 of the conduit 312.

A pulse combustor produces pressure oscillations in the combustion chamber and flow oscillations in the inlet and exhaust pipes. The average frequency of these oscillations is denoted as 'f', which refers to the average number of combustion events per second inside the pulse combustor system, i.e., the operating frequency of the pulse combustor system. The average speed of sound inside the pulse combustor is denoted as 'c'. The corresponding wavelength, denoted as 'λ', can be calculated by Eq. 6:

$$\lambda=c/f\qquad\text{Eq. 6.}$$

And for a quarter-wave duct 350 with a constant cross-sectional area, the length of quarter-wave duct 350 can be determined by Eq. 7:

$$l = \frac{c}{4f}.\qquad\text{Eq. 7}$$

The diameter of quarter-wave duct 350 is more arbitrary and is driven by fluid-dynamic considerations. In some embodiments, the diameter of quarter-wave duct 350 is uniform. In some embodiments, the diameter of quarter-wave duct 350 is different from the diameter of the conduit 312. In some embodiments, the diameter of quarter-wave duct 350 is larger than the diameter of the conduit 312. The idea is to also use the larger diameter duct as an ejector nozzle or "augmenter" for these entrain ambient air to increase total airflow and multiply thrust, and these nozzles typically have a diameter that is approximately two times the diameter of the primary jet, so the larger diameter duct would have a diameter that is approximately twice the diameter of the inlet/exhaust duct.

Combustor 310 is often referred to as a Reynst combustor in the literature. The Reynst combustor involves a Helmholtz resonator in which a thermo-acoustic instability is excited and sustained by combustion events. Combustor 310 is similar to the front-end of a valveless pulsejet, e.g., the combination of combustion chamber and inlet pipe. The short inlet duct 312 connecting the combustion chamber to the atmosphere (which serves as both inlet and exhaust in FIG. 3A) presents a poor impedance match and is therefore not expected to produce an efficient device. However, if this inlet pipe is then placed at or near the entrance of a larger-diameter duct, which is of length approximately one-quarter wavelength, then the performance of this device can be greatly improved for several reasons.

For example, the larger diameter quarter-wave duct 350 serves as an augmenter that can amplify the thrust of the device (and correspondingly reduce the specific fuel consumption).

The Reynst combustor 310, which forms the "core" of the system 300, serves to energize a quarter-wave mode of the larger diameter duct, with the first opening 355 being a pressure anti-node at the combustor end, and the second opening 360 being a pressure node at the open (far) end. In general, a pressure anti-node is where the pressure oscillation amplitude is near or at maximum, and pressure node is where the pressure oscillation amplitude is near or at zero. This implies that the larger diameter duct does not allow the gas coming out of the engine core to expand fully, but then expands it through its own quarter-wave mode, providing a better impedance match for the remaining expansion, and therefore more efficient operation. (e.g., providing more thrust for the same heat input.) In other words, the gas expands as it exits the core (Reynst combustor 310), but not to steady/atmospheric levels because it exits into the larger diameter duct at the pressure anti-node 355. Further expansion takes place via the quarter-wave mode of this duct, which provides a favorable impedance match to the atmosphere, allowing more efficient operation than the core (Reynst combustor 310) itself.

FIG. 3B illustrates associated pressure oscillation amplitudes along the length of the pulse combustor system depicted in FIG. 3A. The x-axis of FIG. 3B corresponds to the length of the pulse combustor system 300, and the y-axis of FIG. 3B is the pressure oscillation amplitude. FIG. 3B has three segments: 332, 334, and 336. Segment 332 is substantially corresponding to chamber 314; segment 334 is substantially corresponding to inlet/exhaust pipe 312; and segment 336 is substantially corresponding to duct 350.

Figure 4:
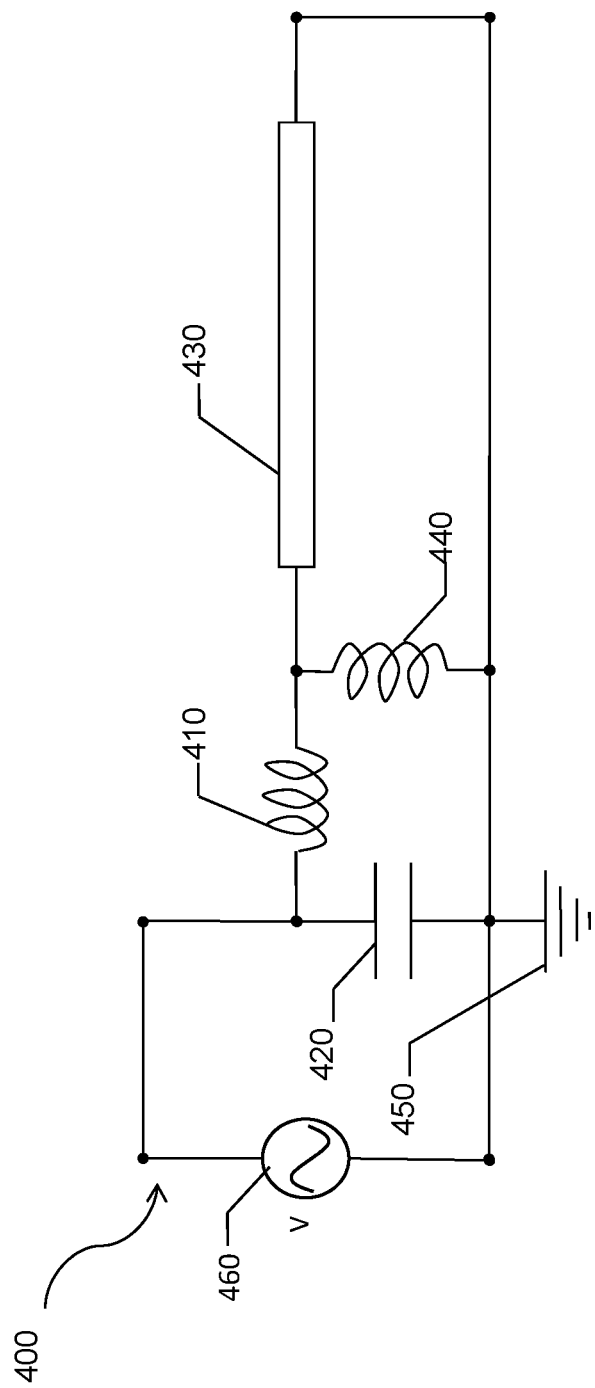
FIG. 4 illustrates an electric circuit analogy for a pulse combustor system according to certain embodiments of the present disclosure.

FIG. 4 is the electric circuit analogy 400 equivalent of the embodiment of the present invention shown in FIG. 3A. One terminal of capacitor 420 is connected to electrical ground 450, while the other terminal of capacitor 420 is connected to inductor 410. Inductor 410 is connected to capacitor 420 at one end, while the other end is connected to inductor 440 and transmission line 430. Inductor 440 is connected to inductor 410 and transmission line 430 at one end, while the other end is connected to electrical ground 450. Transmission line 430 is connected to inductor 410 and inductor 440 at one end, while the other end is connected to electrical ground 450. In FIG. 4, voltage source 460 is connected in parallel with capacitor 420, but voltage source 460 can be placed at other suitable locations and/or replaced by other suitable sources such as a current source.

In FIGS. 3A and 4, capacitor 420 is analogous to chamber 314; inductor 410 is analogous to inlet 312; transmission line 430 is analogous to quarter-wave duct 350; and inductor 440 accounts for the air gap between the Reynst combustor inlet/exhaust pipe 312 and the quarter-wave duct 350 wall. Using this electric analogy (FIG. 4), one can see that the fundamental components of this engine concept are essentially the same as those of a valveless pulsejet (FIG. 2). The pressure/voltage oscillations produced by an engine 'core' (Reynst combustor) are converted to velocity/current via a transmission line transformer in both cases, but the flow/current paths are different. The value of the inductor 440 can be approximated by Eq. 8

$$L = \frac{\rho l}{A},$$ Eq. 8 where ρ is the density of the gas of the air gap between the Reynst combustor inlet/exhaust pipe 312 and the quarter-wave duct 350 wall, l is the effective length of the air gap, and A is the annular cross-sectional area between the Reynst combustor inlet/exhaust pipe 312 and the quarter-wave duct 350.

Other embodiments of the same principle and invention are also possible. The premise of this invention is that the Reynst combustor itself serves to energize a prescribed mode of a resonance tube/duct which provides better impedance matching than the short inlet/exhaust duct of the Reynst combustor alone. Another possible embodiment of this invention is a Reynst combustor exhausting at the pressure anti-node of a half-wave tube. One way to realize this is to extend the quarter-wave duct in FIG. 3 over the engine core (the Reynst combustor) with the appropriate length and cross-sectional area increase such that the inlet/exhaust of the engine core is coincident with or close to the pressure anti-node of the larger diameter, half-wave duct as shown in FIG. 5A.

Figure 5A:
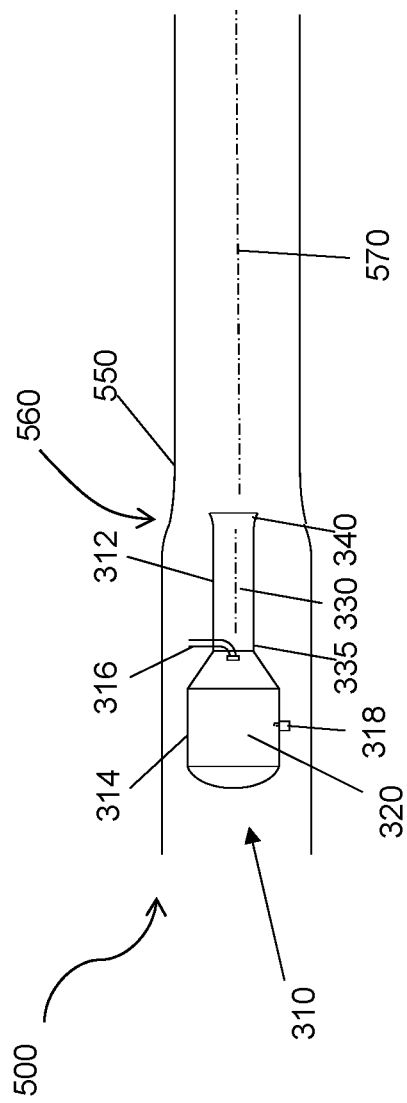
FIG. 5A illustrates a pulse combustor system according to certain embodiments of the present disclosure.

FIG. 5A illustrates a pulse combustor system 500 according to certain embodiments of the present disclosure. In FIG. 5A, the pulse combustor system 500 includes a pulse combustor 310 and a half-wave duct 550. The combustor 310 includes a combustion chamber 314, inlet/exhaust pipe 312, a fuel injector 316, and a spark plug 318. Combustion chamber 314 defines an internal space 320. Inlet/exhaust pipe 312 can also be referred as a conduit 312. Conduit 312 has a central longitudinal axis 330, a first end 335 in fluid communication with the internal space 320, and a second end 340 in fluid communication with an environment outside of the pulse combustor 310. Fuel injector 316, configured to inject fuel into the internal space, is located somewhere inside combustion chamber 314 and/or inlet/exhaust pipe 312, but other locations and geometries for fuel injector (s) are also possible. Spark plug 318, configured to provide an ignition source for starting the pulse combustor 310, is located in combustion chamber 314 to provide an ignition source for starting, but any other ignition means (such as a glow plug) can also be used instead of a spark plug. Half-wave duct 550 has a central longitudinal axis 570. In FIG. 5A, Reynst combustor 310 is placed inside half-wave duct 550. In some embodiments, the inlet/exhaust pipe 312 opens at or near the pressure anti-node 560 of the half-wave mode of half-wave duct 550. This arrangement allows the engine core to energize the half-wave mode of the larger diameter, half-wave duct for thrust production. One advantage of the system in FIG. 5A is that it can allow for ram air pressure recovery and/or better entrapment of the acoustic energy coming out the engine core. In some embodiments, the central longitudinal axis 330 of the conduit 312 and the central longitudinal axis 570 of the half-wave duct 550 are substantially aligned.

For a constant-area duct, the length of a half-wave duct is twice the length of a quarter-wave duct discussed above, and can be determined by Eq. 9:

$$l = \frac{c}{2f}.$$ Eq. 9

However, if there is a cross-sectional area change (as shown in FIG. 5A), Eq. 9 does not hold and the physical parameters need to be calculated numerically and/or empirically as appreciated by people skilled in the art.

Figure 5B:
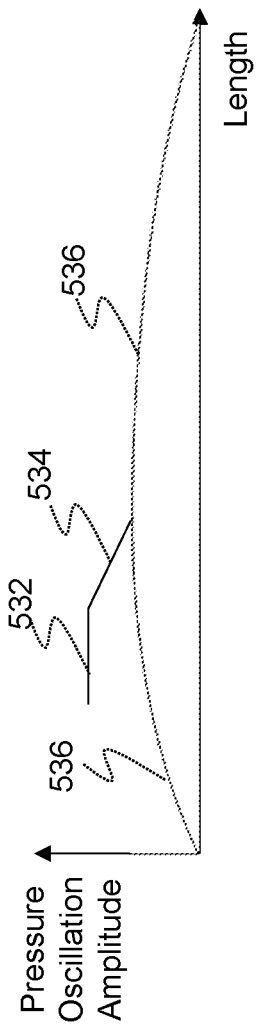
FIG. 5B illustrates associated pressure oscillation amplitudes along the length of the pulse combustor system depicted in FIG. 5A.

FIG. 5B illustrates associated pressure oscillation amplitudes along the length of the pulse combustor system depicted in FIG. 5A. The x-axis of FIG. 5B corresponds to the length of the pulse combustor system 500, and the y-axis of FIG. 5B is the pressure oscillation amplitude. FIG. 5B has three segments: 532, 534, and 536. Segment 532 is substantially corresponding to chamber 314; segment 534 is substantially corresponding to inlet/exhaust pipe 312; and segment 536 is substantially corresponding to duct 550 along the entire length of the duct 550, including the portion in which the pulse combustor 310 is disposed.

It is contemplated that systems, devices, methods, and processes of the claimed disclosure encompass variations and adaptations developed using information from the embodiments described herein. Adaptation and/or modification of the systems, devices, methods, and processes described herein may be performed by those of ordinary skill in the relevant art.

The preceding description covers the basic design, theory of operation, and different embodiments of the invention. However, in the design and implementation of a practical embodiment of this engine, as with any practical engine, a number of auxiliary devices and/or adjustments may be required for operation. For example, a starting air nozzle may be required. As another example, a support structure or connecting members will likely be necessary, and their design will depend on the particular application. As yet another example, the exact dimensions of engine components (e.g. the quarter-wave duct, air gap length, etc.) may need some empirical adjustment that could be part of an iterative design process or be provided by an active adjustment mechanism. These examples illustrate the practical considerations in implementing the present invention, but are also relevant to any engine, and as such should not limit the scope of the invention. It is understood that such auxiliary and practical aspects of the invention are not addressed in this description because of their familiarity to those skilled in the art.

Throughout the description, where articles, devices, and systems are described as having, including, or comprising specific components, or where processes and methods are described as having, including, or comprising specific steps, it is contemplated that, additionally, there are articles, devices, and systems of the present disclosure that consist essentially of, or consist of, the recited components, and that there are processes and methods according to the present disclosure that consist essentially of, or consist of, the recited processing steps.

It should be understood that the order of steps or order for performing certain action is immaterial so long as the disclosure remains operable. Moreover, two or more steps or actions may be conducted simultaneously.

The mention herein of any publication, for example, in the Background section, is not an admission that the publication serves as prior art with respect to any of the claims presented herein. The Background section is presented for purposes of clarity and is not meant as a description of prior art with respect to any claim.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

What is claimed:

1. A pulse combustor system, comprising:
   a pulse combustor, comprising:
      a combustion chamber defining an internal space with the combustion chamber having a first closed end and tapering from a first diameter to an open second end having a second diameter that is less than the first diameter,
      a conduit having a first central longitudinal axis and the second diameter, and with the conduit having a first end connected to and in fluid communication with the open second end of the combustion chamber and a second end in fluid communication with an environment outside of the pulse combustor, with the conduit forming an intake and combustion gas exhaust structure for the pulse combustor, and
      a fuel injector configured to inject fuel into the internal space of the combustion chamber; and
   a duct with a first section having a third diameter, a third section having a fourth diameter that is less than the third diameter, and a second section connected between the first section and the third section and tapering axially from the third diameter to the fourth diameter, and the duct forms an augmenter for entraining ambient air therethrough and multiplying a thrust output by the pulse combustor system a predetermined amount, and having a second central longitudinal axis;
   wherein the pulse combustor system has an average operating frequency, indicating an average number of combustion events per second during operation of the pulse combustor system;
   wherein the second central longitudinal axis of the duct is substantially aligned with the first central longitudinal axis of the conduit, and the pulse combustor is disposed within the first section of the duct with the second end of the conduit being disposed in the second section of the duct spaced a determined distance from the end of the third section of the duct that connects to the second section of the duct, and
   wherein a length of the duct is about one half of a wavelength along the second central longitudinal axis and the wavelength corresponds to the average operating frequency.

2. The pulse combustor system of claim 1, wherein the pulse combustor further comprises a spark plug providing an ignition source for starting the pulse combustor.

3. The pulse combustor of claim 1, wherein the second end of the conduit is disposed at or near a pressure anti-node of the duct during operation of the pulse combustor system at the average operating frequency.

4. A method of producing thrust in a pulse combustor system, comprising:
   providing a pulse combustor, comprising:
      a combustion chamber defining an internal space with the combustion chamber having a first closed end and tapering from a first diameter to an open second end having a second diameter that is less than the first diameter,
a conduit having a first central longitudinal axis, and the conduit having a first end in fluid communication with the internal space and a second end in fluid communication with an environment outside of the pulse combustor, with the conduit forming an intake and combustion gas exhaust structure for the pulse combustor, and
a fuel injector configured to inject fuel into the internal space of the combustion chamber;
providing a duct with a first section having a third diameter, a third section having a fourth diameter that is less than the third diameter, and a second section connected between the first section and the third section and tapering axially from the third diameter to the fourth diameter, with the duct forming an augmenter for entraining ambient air therethrough and multiplying a thrust output by the pulse combustor system a predetermined amount, and having a second central longitudinal axis;
disposing the pulse combustor within the first section of the duct with the second end of the conduit being disposed in the second section of the duct spaced a determined distance from the end of the third section of the duct that connects to the second section of the duct,
wherein the second central longitudinal axis of the duct is substantially aligned with the first central longitudinal axis of the conduit,
wherein the pulse combustor and duct arrangement have an average operating frequency, indicating an average number of combustion events per second during operation of the pulse combustor and duct arrangement,
wherein a length of the duct is about one half of a wavelength along the second central longitudinal axis and the wavelength corresponds to the average operating frequency; and
operating the pulse combustor and duct arrangement at the average operating frequency.

5. The method of claim 4, the disposing the pulse combustor within the duct further comprising disposing the second end of the conduit adjacent to a pressure anti-node formed in the duct during operation of the pulse combustor system at the average operating frequency.

* * * * *